United States Patent
Melika et al.

(10) Patent No.: US 11,232,415 B2
(45) Date of Patent: Jan. 25, 2022

(54) METHOD FOR CRYPTOGRAPHICALLY MANAGING TITLE TRANSACTIONS

(71) Applicant: OX Labs Inc., Los Angeles, CA (US)

(72) Inventors: George Melika, Los Angeles, CA (US); Akbar Thobhani, South San Francisco, CA (US)

(73) Assignee: OX Labs Inc., Los Angeles, CA (US)

( * ) Notice: Subject to any disclaimer, the term of this patent is extended or adjusted under 35 U.S.C. 154(b) by 860 days.

(21) Appl. No.: 15/164,639

(22) Filed: May 25, 2016

(65) Prior Publication Data

US 2016/0350728 A1 Dec. 1, 2016

Related U.S. Application Data

(60) Provisional application No. 62/167,834, filed on May 28, 2015.

(51) Int. Cl.
| | |
|---|---|
| G06Q 20/06 | (2012.01) |
| G06Q 20/38 | (2012.01) |
| G06Q 20/02 | (2012.01) |
| H04L 9/32 | (2006.01) |

(52) U.S. Cl.
CPC ......... *G06Q 20/0655* (2013.01); *G06Q 20/02* (2013.01); *G06Q 20/3829* (2013.01); *H04L 9/3236* (2013.01); *G06Q 2220/00* (2013.01); *H04L 2209/38* (2013.01); *H04L 2209/56* (2013.01)

(58) Field of Classification Search
CPC .................................................. G06Q 10/40
USPC .................................................... 705/50–79
See application file for complete search history.

(56) References Cited

U.S. PATENT DOCUMENTS

| | | | |
|---|---|---|---|
| 9,754,097 B2* | 9/2017 | Hessler | G06F 21/44 |
| 10,719,816 B1* | 7/2020 | Kurani | G06Q 20/401 |
| 2001/0007981 A1* | 7/2001 | Woolston | G06Q 30/06 705/26.41 |
| 2010/0017644 A1* | 1/2010 | Butterworth | G06F 11/1658 714/4.1 |
| 2011/0154031 A1* | 6/2011 | Banerjee | G06F 21/6218 713/165 |
| 2015/0206106 A1* | 7/2015 | Yago | G06Q 20/0655 705/68 |

(Continued)

OTHER PUBLICATIONS

Mizrahi, "A blockchain-based property ownership recording system", downloaded from https://chromaway.com/papers/A-blockchain-based-property-registry.pdf, available on Wayback Machine dated Apr. 17, 2015, attached as PDF file (Year: 2015).*

(Continued)

*Primary Examiner* — James D Nigh
*Assistant Examiner* — Margaret M Neubig
(74) *Attorney, Agent, or Firm* — Cognition IP, P.C.; Edward Steakley (57) ABSTRACT

A method for encrypting paper title assets to crypto currency and transferring title is disclosed. The method involves the use of application software and a physical vault. Application software including an encryption engine, a decryption engine, a user interface module, records, and a security key management system. Paper title assets are provided to a physical vault and transferred physically at the behest of users of the application software and verified by public ledger records.

17 Claims, 6 Drawing Sheets

(56) References Cited

U.S. PATENT DOCUMENTS

| | | | | |
|---|---|---|---|---|
| 2015/0262140 | A1* | 9/2015 | Armstrong | G06Q 20/386 |
| | | | | 705/41 |
| 2016/0267472 | A1* | 9/2016 | Lingham | G06Q 20/20 |
| 2016/0323109 | A1* | 11/2016 | McCoy | G06Q 20/1235 |
| 2016/0330027 | A1* | 11/2016 | Ebrahimi | G06Q 20/02 |
| 2017/0103391 | A1* | 4/2017 | Wilson, Jr. | G06Q 20/3829 |
| 2017/0286922 | A1* | 10/2017 | Ledder | G06Q 30/0231 |

OTHER PUBLICATIONS

"How to get unspents for a specified bitcoin address?" downloaded from https://bitcoin.stackexchange.com/questions/37118/how-to-get-unspents-for-a-specified-bitcoin-address and attached as PDF file.) Apr. 2015 (Year: 2015).*

"Importing Bitcoin", downloaded from http://www.thecleverest.com/importing-bitcoin-from-a-paper-wallet-into-electrum/and attached as PDF file, dated Mar. 12, 2014. (Year: 2014).*

Off-the-chain, (downloaded from http://gavintech.blogspot.com/2012/07/off-chain-transactions.html, dated Jul. 2012 and attached as PDF file). (Year: 2012).*

MizrahiWayback, "A blockchain-based property ownership recording system", downloaded from https://chromaway.com/papers/A-blockchain-based-property-registry.pdf, available on Wayback Machine dated Apr. 17, 2015, attached as PDF file to validate the date (Year: 2015).*

NPL Hidden surprises, downloaded from http://www.righto.com/2014/02/ascii-bernanke-wikileaks-photographs.html attached as pdf file of the Wayback file supporting date. (Year: 2014).*

"What is a Bitcoin Address and How do You Sign It?", downloaded from https://bitcoinmagazine.com/articles/bitcoin-address-sign-1399914228, dated May 12, 2014, and attached as a PDF file. (Year: 2014).*

Mizrahi, "A blockchain-based property ownership recording system", downloaded from https://chromaway.com/papers/A-blockchain-based-property-registry.pdf, available on Wayback Machine dated Apr. 17, 2015, attached as PDF file in prior office action, (Year: 2015).*

"How to get unspents for a specified bitcoin address?" downloaded from https://bitcoin.stackexchange.com/questions/37118/how-to-get-unspents-for-a-specified-bitcoin-address and attached as PDF file in previous action (Year: 2015).*

NPL Hidden surprises, downloaded from http://www.righto.com/2014/02/ascii-bernanke-wikileaks-photographs.html, previously attached as pdf file of Wayback file supporting date. (Year: 2014).*

Mizrahi, "A blockchain-based property ownership recording system", downloaded from https://chromaway.com/papers/A-blockchain-based-property-registry.pdf, available on Wayback Machine dated Apr. 17, 2015, PDF file attached to Apr. 4, 2019 Action (Year: 2015).*

"How to get unspents for a specified bitcoin address?" downloaded from https://bitcoin.stackexchange.com/questions/37118/how-to-get-unspents-for-a-specified-bitcoin-address and PDF file attached to Apr. 4, 2019 Action) Apr. 2015 (Year: 2015).*

"Importing Bitcoin", downloaded from http://www.thecleverest.com/importing-bitcoin-from-a-paper-wallet-into-electrum/and PDF file attached to Apr. 4, 2019 Action, dated Mar. 12, 2014. (Year: 2014).*

Off-the-chain, (downloaded from http://gavintech.blogspot.com/2012/07/off-chain-transactions.html, dated Jul. 2012 and PDF file attached to Apr. 4, 2019 Action). (Year: 2012).*

Mizrahiwayback, "A blockchain-based property ownership recording system", downloaded from https://chromaway.com/papers/A-blockchain-based-property-registry.pdf, available on Wayback Machine dated Apr. 17, 2015, attached as PDF file to validate the date; PDF file attached to Apr. 4, 2019 Action (Year: 2015).*

NPL Hidden surprises, downloaded from http://www.righto.com/2014/02/ascii-bernanke-wikileaks-photographs.html attached as pdf file of the Wayback file supporting date; PDF file attached to Nov. 4, 2019 Action. (Year: 2014).*

"What is a Bitcoin Address and How do You Sign It?", downloaded from https://bitcoinmagazine.com/articles/bitcoin-address-sign-1399914228, dated May 12, 2014, and attached as a PDF file to Oct. 2, 2020 Action. (Year: 2014).*

"A blockchain-based property ownership recording system", (downloaded from https://static 1.squarespace.com/static/5e26f18cd5824c7138a9118b/t/5e3c1c7d6d5ff061da34da80/1580997757765/A-blockchain-based-property-registry.pdf, attached as PDF file; Action dd Apr. 17, 2015 supplied Wayback Machine date (Year: 2015).*

* cited by examiner

METHOD FOR CRYPTOGRAPHICALLY MANAGING TITLE TRANSACTIONS

CROSS-REFERENCE TO RELATED APPLICATION(S)

This application claims the benefit of U.S. Provisional Patent Application No. 62/167,834 entitled "METHOD FOR CRYPTOGRAPHICALLY MANAGING TITLE TRANSACTIONS," filed on May 28, 2015, which is incorporated by reference herein in its entirety.

FIELD OF THE INVENTION

The invention relates to enabling secure transfer of title assets. The invention more particularly relates to a method for cryptographically managing title transactions.

BACKGROUND

Paper titles, or electronic titles such as titles for automobiles, are low security documents. Should a malicious actor come across paper titles, there are very limited safeguards to prevent the malicious actor from signing over the title to themselves. Conversely securing paper title documents inhibits the ability to transfer the documents. Accordingly, there is a long felt need to enable paper title documents to transferred easily and held security.

Similarly, electronic titles also have security risk. Improving security by adding additional safeguards and improving management capability is a useful endeavor.

SUMMARY

Embodiments include a method for transferring title assets. The method begins first where a processor records into a memory the receipt of a title for a non-monetary asset at a physical vault. An application encodes identifying information associated with the paper title to a crypto currency distributed digital public ledger. The owner of the paper title provides indication to an application operated by a processor to transfer the title to another party. The application encodes the transaction data associated with the transfer of title from the owner to the another party on a distributed digital public ledger. Finally, the application provides notification through an API or a user interface to the physical vault to transfer ownership of the paper title to the another party.

DETAILED DESCRIPTION

Figure 1:
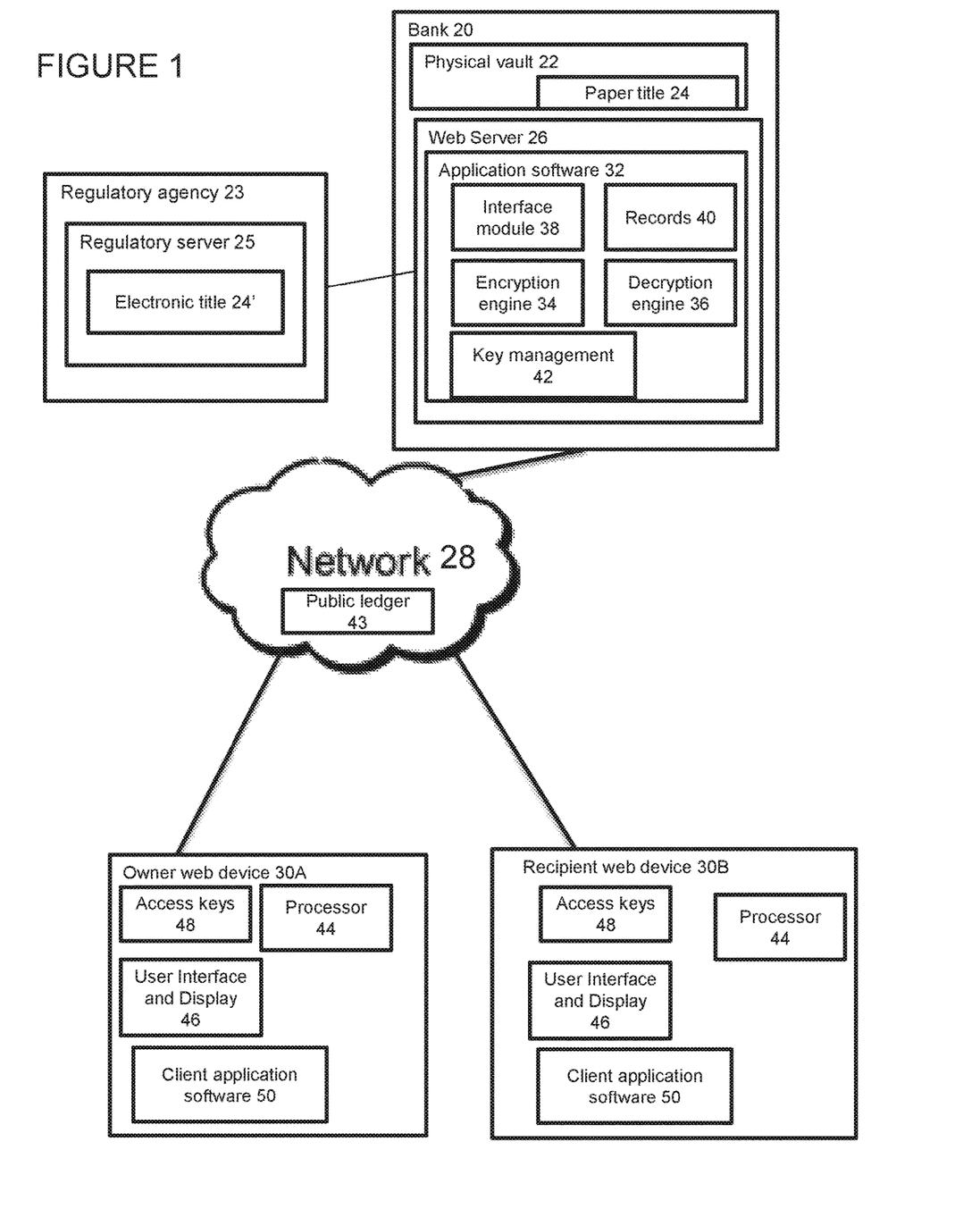
FIG. 1 is an illustrative block diagram of a preferred crypto currency encoded transaction network.

FIG. 1 is an illustrative block diagram of a preferred crypto currency encoded transaction network. An element of the method is a bank 20. The bank 20 has a vault 22. In this case, "bank" does not necessarily have to refer to a regulated entity. Bank merely refers to an entity that provides some form of secure storage. In a physical vault are paper titles 24. The paper titles 24 belong to bank customers and represent ownership of physical non-monetary assets of these clients. In some embodiments, titles 24 are represented by electronic titles. Some regulatory agencies 23 issue electronic titles 24' as well. Electronic titles 24' are often stored on regulatory agency servers 25. Examples of non-monetary assets include but are not limited to automobiles, real property, boats, planes, and industrial equipment. The primary criteria for non-monetary asset is an asset which is exchanged through title transfer.

Additionally involved in the system and method is a web server 26. The web server 26 communicatively connected to the Internet 28 and with customer web devices 30A, 30B. The web server 26 includes application software 32. The application software 32 operates an application which is accessible by customers from customer web devices 30A, 30B and provides an interface and an API (application programming interface) for customer interaction with the bank 20. Application software 32 comprises an encryption engine 34, a decryption engine 36, a user interface module 38, records 40, and a security key management system 42. While the web server 26 is shown in the Figure as a component of the bank 20, the web server 26 does not necessarily have to be associated directly with the bank 20, nor must the web server 26 comprise a single computer, or reside at a single location.

Application software 26 further provides an encryption scheme with a cryptocurrency operated on a public ledger 43. Cryptocurrencies are controlled through a distributed consensus network maintaining a cryptographically verifiable ledger 43 utilizing a proof process to enforce a chronological order amongst logistic transaction records in the cryptographically verifiable ledger 43. A proof process is one that is some combination of proof-of-work, proof-of-stake, Byzantine agreement, Tendermint, Stellar Consensus Protocol, and/or other suitable proof methods known in the art. The proof process may have components of only one or a mixture of two or more.

Cryptocurrencies make use of digital wallets with access keys (both public and private) to access the currency store within. Cryptocurrency wallets are identified by a public address or key, and accessed by a private address or key. These two keys are mathematically related. In some embodiments, Cryptocurrency wallets are defined by the sum of all transactions within the wallet. However, wallets with very small amounts of currency are configured to encode data. There are numerous embodiments to encode data to a crypto currency.

In an embodiment of encoding data to currency, a transaction hash is created which corresponds to a transfer of a nominal amount of crypto currency and the hash itself further corresponds to a specific set of data or text. One who has the original text can verify that text with the hash of the nominal transaction. Data includes part of a title, identifying information for the title, or the whole title.

Web devices 30A and 30B belong to the owner of the asset title 24, and the recipient of the asset title 24. Web devices 30A, 30B may comprise devices such as smart phones, tablets, laptops, desktops, or other suitable Internet connected electronic devices known in the art. As such, these devices are operated by a processor 44, and include a user interface and display 46. Web devices 30A, 30B may include a stored access key 48 or keys such as cryptographic public and private keys, or merely the private key. In use, stored access keys 48 are communicated by client application software 50 to the key management system 42 for use. In some embodiments the stored cryptographic key is not directly related to the public ledger 43. Instead, the access key 48 is matched with records 40 in the application software 32 that the web server 26 uses to identify particular users. Examples include MAC addresses of web devices 30A, 30B, security limited lifespan tokens, and account IDs.

In an illustrative example, the details of an automobile title are hashed and the hash is submitted as additionally representing a transaction for a nominal amount. That transaction is inserted into a public ledger 43 at a specific time. Thus one with the a codec or a has key to decode the hash would know that at the given time, the automobile title was held by a party able to decode the hash. This is an encoded transaction.

In another embodiment of encoding data to currency, a series of records correspond to digital wallets and the amounts in the digital wallets further has an encoded meaning. In an illustrative example, a digital wallet represents a given person's association with a given automobile title. When there is a specified encoded amount of currency, say 0.00000001, in the wallet, the given person has full ownership of the automobile described by the title. When the wallet is empty, the given person no longer owns the automobile. In further examples different values in the digital wallet correspond to different information. In another illustrative example, each digit in the amount 0.00029275 corresponds to certain identifying information about the asset. This is an encoded amount.

Where an electronic title 24' is used rather than a paper title 24, the communication differs. A vault 22 in a bank 20 is unnecessary, though additional security is obtained through use of the consensus network. In some embodiments, a digital vault 22' is used. A user would provide the web server 26 access to the electronic title 24' with means as used by the associated regulatory agency 23. Where an electronic certificate/token is used, the user provides the web server 26 with said electronic certificate/token. Where identity information is used, the user provides the web server 26 with the identity information necessary. Where power may be transferred to a third party, the user transfers authority with the regulatory agency 23 from themselves to the web server 26. In some embodiments, the control of the web server 26 of the electronic title 24' via the regulatory agency 23 is exclusive.

An alternate embodiment to the public ledger 43, is a Byzantine algorithm 43' which still involves a distributed consensus network, though that network is no longer necessarily public, and operates on a Byzantine fault tolerance.

A Byzantine fault is an arbitrary fault that occurs during the execution of an algorithm by a distributed system. It is the most serious type of failure because it encompasses all types of failures mentioned in the previous section. When a Byzantine failure has occurred, the system may respond in any unpredictable way unless it is designed to have Byzantine fault tolerance. Byzantine fault tolerance is very important because small arbitrary failures in one node, can bring down the whole system. For example, consider the case where the output of one function is the input of another. Small round-off errors in the first function can produce much larger errors in the second. If the second function were fed into a third, the problem could grow even larger, until the values produced are worthless. Such failures have may occur when a single-bit hardware error propagates through a system.

The Byzantine failure assumption models real-world environments in which computers and networks may behave in unexpected ways due to hardware failures, network congestion and disconnection and also due to malicious attacks. Byzantine failure-tolerant algorithms must cope with such failures and still satisfy the specifications of the problems the algorithm is designed to solve. Such algorithms are characterized by their resilience, the number of faulty processes with which an algorithm can cope. Byzantine Failures in distributed systems can be modeled using the Byzantine Generals' Problem as known in the art.

Figure 2:
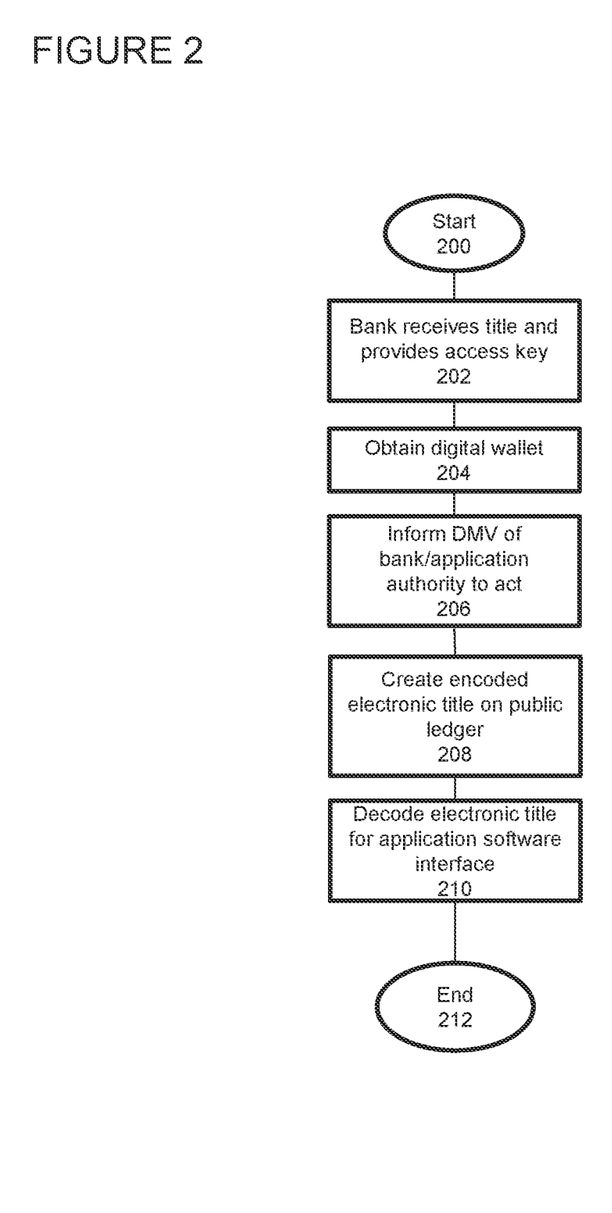
FIG. 2 is a flow chart of an encrypted receipt of a non-monetary asset.

FIG. 2 is a flow chart of an encrypted receipt of a non-monetary asset. In step 202, the owner of an asset (customer) registers the asset with the application software. Registration involves providing any associated paper title to the bank vault or access to the electronic title. The application software (on computer, website, mobile) provides the customer a key. The key is used to identify the customer in later transactions with the application software. In some embodiments, the key is the private key associated with the digital wallet of cryptocurrency. The key is stored on paper, hardware devices, on mobile, smart phones, on the web, hardware security modules, and many other such technologies.

In other embodiments, a physical device is used to protect the key. Physical keys come in many forms. In some cases USB sticks with hardcoded device ID's are keys. In others, certain web devices have cards installed on the device which act as a key when using that device. In still others, devices already owned by a customer are adopted as a key. Such devices would comprise at least computers, laptops, or smartphones. Physical keys are obtained in a number of ways. The application software recognizes the device ID associated with the customer.

In step 204, the application software generates a digital wallet of crypto currency for the customer. Alternatively, if the customer already owns a digital wallet, the application software is enabled to adopt that wallet or can send title to that wallet by sending the cryptocurrency with the asset title (or asset title reference). The digital wallet is protected in the application software by various digital security measures, and the various private keys. The user may not actually have direct access to the private key associated with the cryptocurrency wallet. Instead the user would be provided with alternate access keys 48, that enable secure communication with the bank 20. In some embodiments the access keys 48 are the cryptocurrency private and/or public keys as associated with the digital wallet, in such cases, the wallet is created at the same time that the user is provided an access key 48.

In step 206, the owner informs the recordation agency responsible for chain of title of the asset (such as the DMV for automobiles) of the bank's authority to act. In some embodiments informing the recordation agency occurs through providing the recordation agency the necessary identification information to use the application software. In some jurisdictions this requires signed consent forms. In response to the recordation agency provides the bank and application software the right to manage the title electronically within the recordation agency.

In still other embodiments, the owner of the asset has no direct association with the recordation agency and instead, when the customer provides the asset title to the bank, the title is provided in executed form. An executed title sits in the bank vault until transfer to a third party, then the bank fills in the executed title in favor of the third party.

In step 208, the application software creates an electronic title and adds the title to the customer's digital wallet through an encrypted transaction or an encrypted amount. The bank vault has the title in benefit of the customer and the customer is enabled to prove ownership of an asset through access of the application software on a web enabled device (such as a smartphone). In step 210, the application software decodes the encrypted data on the public ledger, and then forwards decrypted data (over a secure channel) to the user interface of the customer's web enabled device for viewing.

Figure 3:
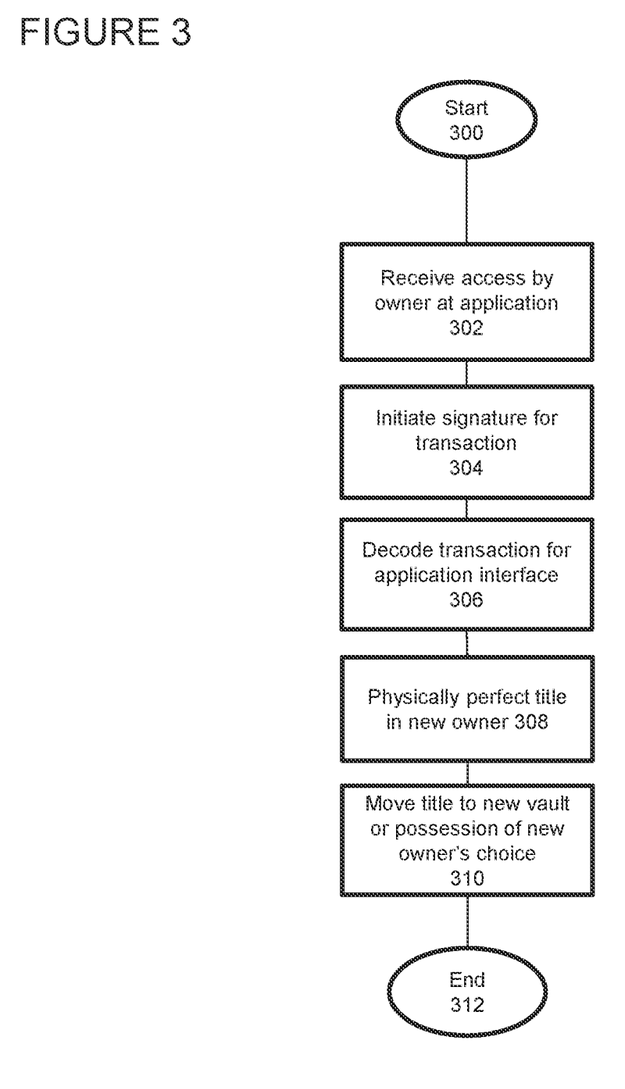
FIG. 3 is a flow chart of an encrypted transaction involving non-monetary assets.

FIG. 3 is a flow chart of an encrypted transaction involving non-monetary assets. Title is transferred in the same manner one sends crypto currency to a recipient. Examples include over email, phone data, or other networks.

The transfer first uses the stated intention by the owner, and some reference to the bank. Embodiments for reference to the bank include a CC'd email address, reference to a social media handle (e.g. Twitter), use of a bank monitored digital wallet address, mention of the bank in the encoding of the transaction, or through the application software. The recipient preferably is also a user of the application software. It is unnecessary for the recipient to additionally utilize the same bank or physical vault structure.

In step 302, a transfer of paper title uses the owner's access key. In some embodiments, this key is the private key associated with a cryptocurrency wallet. In others, this key is an independent key which is associated by the application software to the private key of the crypto currency wallet. Once the owner has provided the key, or provided some connection to the key, the transaction will proceed. An illustrative example of "connection to the key" is where a social media account has a known association with the key. Thus, logging into the social media account is suitable for providing key authorization. Such known associations are generated and stored by the application software as records in a database. The application software references the records to find connections between user accounts and particular users such as the owner of the paper title and the recipient.

In step 304, the record of the transfer occurs with an encrypted transaction of crypto currency. Using a public and private key from at least a digital wallet associated where the paper title is encoded, the application software builds a transaction to propagate through the distributed consensus network. The nature of this transaction varies between embodiments.

In some embodiments, the transfer of the paper title is recorded largely using encoded data which is hashed to the transaction. The encoded data includes the updated title information, thus the encoded data for the paper title may stay at the same digital wallet/public address. Alternatively, the encoded data for the paper title, may newly reside at a recipient public address.

In some embodiments, multiple private keys are used. Using a multi signature transaction (e.g. 2 of 3 keys) where the owner's key is at least associated with one of the three keys, the transaction is signed and validated on the public ledger. The other keys are held by the application software, an escrow service, the bank, or the recipient in the transaction.

In an encoded transaction, the title is moved to a new party through hashed data representing this fact. With encoded amounts, a specific amount of crypto currency is moved from a digital wallet representing the original owner, to the digital wallet representing the recipient. In step 306, once decoded on the application software, the application software interface displays the record of the transaction to any interested party.

In step 308, the bank is informed by the application software to perfect transfer of asset title to the new recipient. In doing so, the bank informs the regulatory agency of the change. In some embodiments, the user will inform the regulatory agency. In transferring title, the new recipient is given the choice of changing physical vaults or obtaining the paper title for personal storage.

The recipient pays the owner in any suitable payment mechanism known in the art (cash, credit, check, wire transfer, cryptocurrency transfer, etc. . . . ). In this embodiment, the transfer is conducted based upon the assumption that all parties will act in good faith. The method further teaches aspects where assumptions of this kind are not made.

Figure 4:
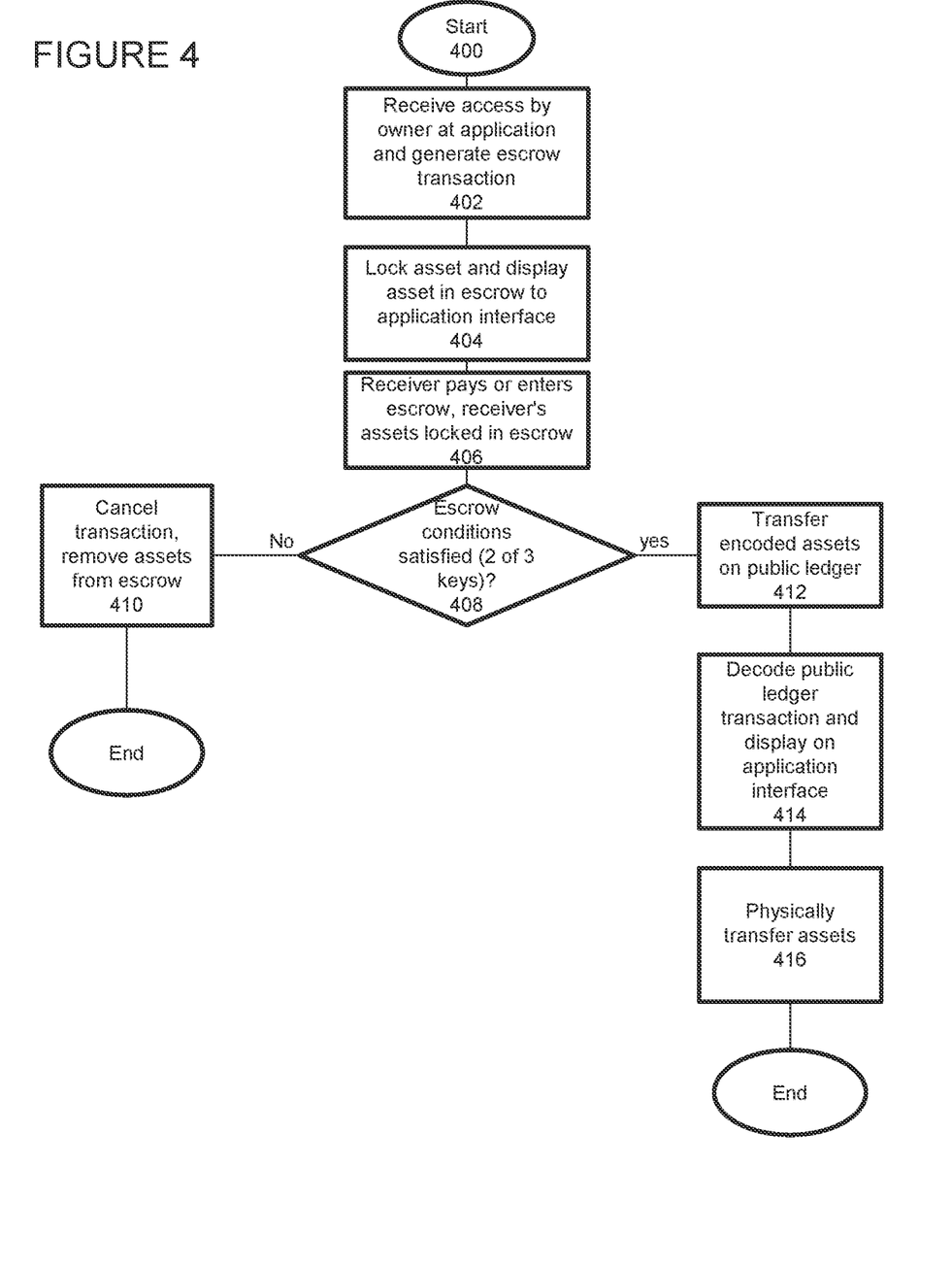
FIG. 4 is a flow chart of an encrypted transaction involving non-monetary assets with an escrow feature.

FIG. 4 is a flow chart of an encrypted transaction involving non-monetary assets with an escrow feature. In step 402, the asset owner initiates a transfer using the key provided, and indicates the need for an escrow option. In some embodiments this is a one sided escrow transaction. A one-sided escrow transaction locks the asset until a certain time has elapsed without a confirmed transaction, or the transaction is processed.

In other embodiments this is a two-sided escrow transaction. Two-sided escrow transactions seek the other side of the transaction. When the requisite assets are present on either side of the transaction the transaction is completed.

In step 404, with either escrow transaction, the title owner would first initiate the transfer which locks the title. This assures the receiver that the transfer will take place or there is some recourse. The escrow transaction is encoded to the public ledger using cryptocurrency. Escrow data such as the asset to be transferred, the amount paid, and the parties involved encoded into a transaction. This encoded transaction either uses a new digital wallet (as an "escrow wallet"), or continues using the same digital wallet of the title owner. When the same digital wallet is used, the encoded transaction includes a transaction hash that when decoded describes the details of the escrow arrangement. In some embodiments, an encoded amount of currency is transferred from the title owners digital wallet to a first side escrow digital wallet.

In step 406, the receiver then pays in any form the receiver chooses. In the case of a two sided escrow, the receiver indicates the presence of an exchange asset of currency. In some transactions the exchange currency is crypto currency. Where the exchange asset is not a title, the recipient provides the exchange asset to a secure entity in communication with the application software such as a bank. In this circumstance, the non-title asset is encoded in the same manner as the title asset. For example, the non-title asset could be a bank draft and the holder of the private key can "cash" the bank draft from the bank.

Where the exchange asset is crypto currency the encoding does not use an encoded amount. Instead the actual amount is transferred from the recipients digital wallets to a second-side escrow wallet. Where an encoded transaction is used, the presence of the escrowed funds is represented through a transaction hash.

In step 408, two out of three signatures would be needed to complete the transfer or cancel the transaction. Examples of the pairs are: the owner and recipient, the owner and escrow, or recipient and escrow are enabled complete or cancel the transaction. If the owner does not release the title, the recipient has recourse by contacting the escrow. Also, in step 410, if recipient does not make the payment, then the owner and escrow are enabled to cancel the transaction. Lastly, both owner and recipient are enabled to mutually cancel the transaction without involving escrow.

In step 412, In a one-sided escrow, once the recipient makes the payment, the owner releases the title and the bank will perfect title completely to the recipient. In two-sided escrow there is an option to provide the escrow with the owner and recipient signature keys and the terms of the escrow. Once the terms have been met, the escrow will automatically sign the transaction and perform the transfer.

In step 414, once decoded on the application software, the application software interface displays the record of the transaction to any interested party. In step 416, the physical paper title is transferred within the bank to the recipient party (held in the custody of the first bank or a new bank).

In an alternate embodiment of a two-sided escrow both parties make use of the application software displayed on mobile devices such as a smart watch or a smart phone. The mobile device displays the assets in escrow (such as on the phone screen or watch face screen) and the two parties bring the mobile devices into a certain proximity of one another to sign the transaction. Where a smartwatch is utilized, the parties shake hands to sign the transaction.

Step one, parties initiate their own contribution to the escrow (so both of their respective contributions are locked, perhaps there is an escrow in the middle with the $3^{rd}$ signature) Step two, the parties see either their own contribution to the escrow or the other party's contribution on respective watch faces. Step three, the parties verify that the contents of the escrow are suitable. Step four, the parties shake watch hands wherein the smart watch detects the presence of the neighboring watch and the shaking motion of the joined arms. The detection of the two features causes the transaction to be signed and the escrow completed.

Figure 5:
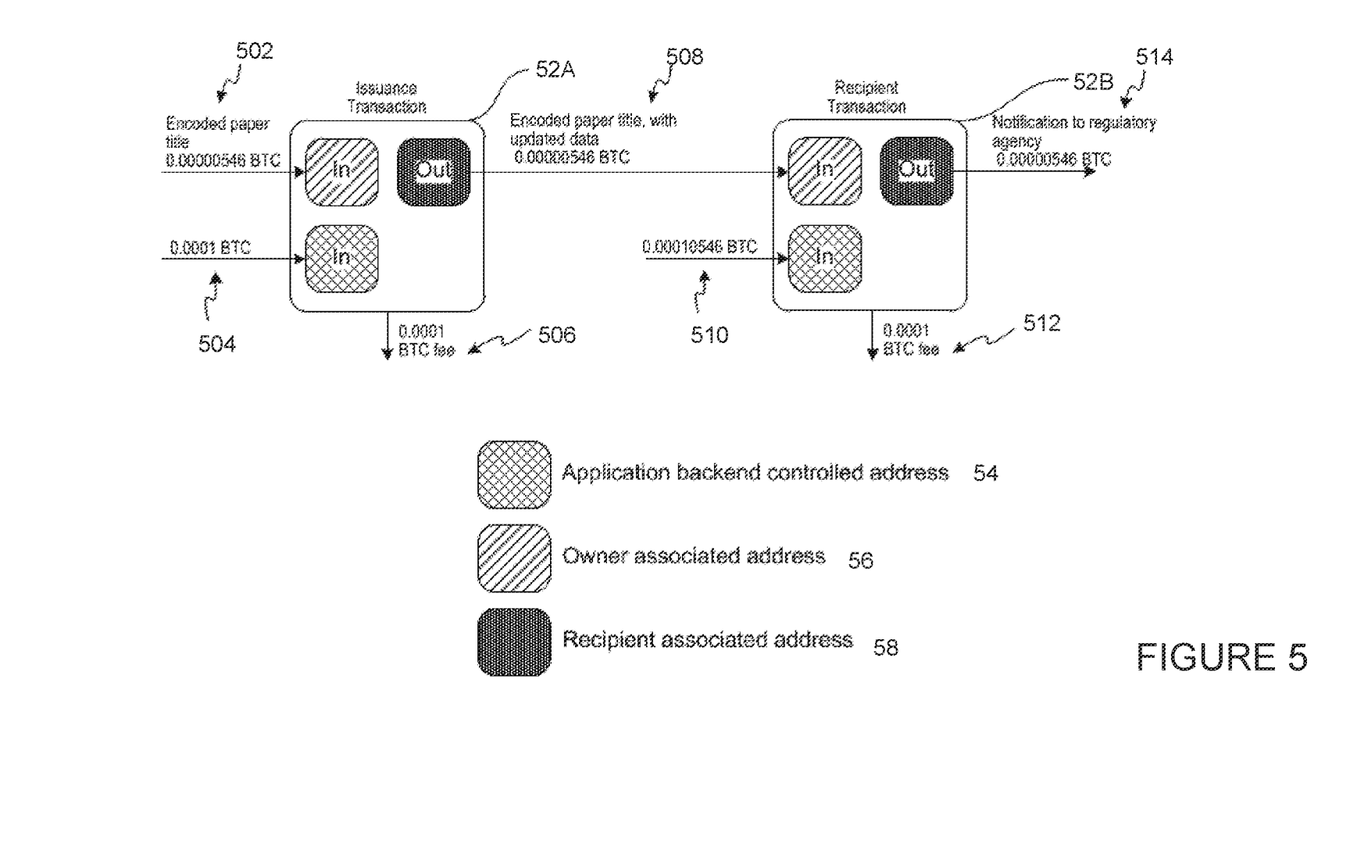
FIG. 5 is a block diagram displaying a process of using the bitcoin blockchain.

FIG. 5 is a block diagram displaying a process of using the bitcoin blockchain. Bitcoin is a commonly used cryptocurrency. While other cryptocurrencies may be used, this provides a specific implementation example. Displayed are two transaction records 52A, 52B. An issuance transaction 52A and a transaction to a recipient 52B. Bitcoin may include transaction with multiple inputs and outputs. In this case there are addresses associated with the application backend 54, the original owner and the title 56, and the recipient of a title 58. Bitcoin often has fees in order to transact. Additionally, the Bitcoin blockchain has a minimum transaction amount which is represented by 0.00000546 BTC, though this is subject to change (hereafter "dust").

In this example, the Figure will be described with reference to a car, though titles are used for other assets as well. In step 502, the encoded paper title is transmitted to an owner. In this case, with a car, this title come from the DMV, the manufacturer, the dealer, or perhaps stored in a wallet onboard the car's computer. In such cases, the issuing address (input) may not be directly associated with the original owner, but rather generated and managed by the web application as a placeholder. The dust amount is transferred in to the transaction and to the transaction an encoded hash is applied such that with the hash key, this transaction will always show proof of the existence of the encoded information recorded at the time of this issuance transaction 52A.

In step 504, the web server's backend processes address 54 provides the necessary fees for the issuance transaction 52A. In step 506, these fees are removed by the consensus network. The output address of this transaction, the recipient address 58 is the first owner.

In step 508, the output address of the first issuance transaction 52A becomes one of the input addresses of the recipient transaction 52B. The dust amount that was transferred to this address is once again used in order to encode new data pertaining to the car's paper title. In step 510, the backend once again funds the transaction; however, this time, an additional dust amount is provided with the transaction fees to enable a DMV notification transaction. The output of the recipient transaction 52B is an bitcoin address associated with the new buyer for the car. In step 512, the consensus network extracts the fee from the transaction.

In step 514, the address associated with the buyer generates another encoded transaction to notify the DMV of the transfer of the car. The dust amount here comes from the fact that 2 dust amounts were input into the recipient transaction 52B. Thus one is output to notify the DMV, and one more dust amount remains to transfer the car to yet a third owner if necessary.

Figure 6:
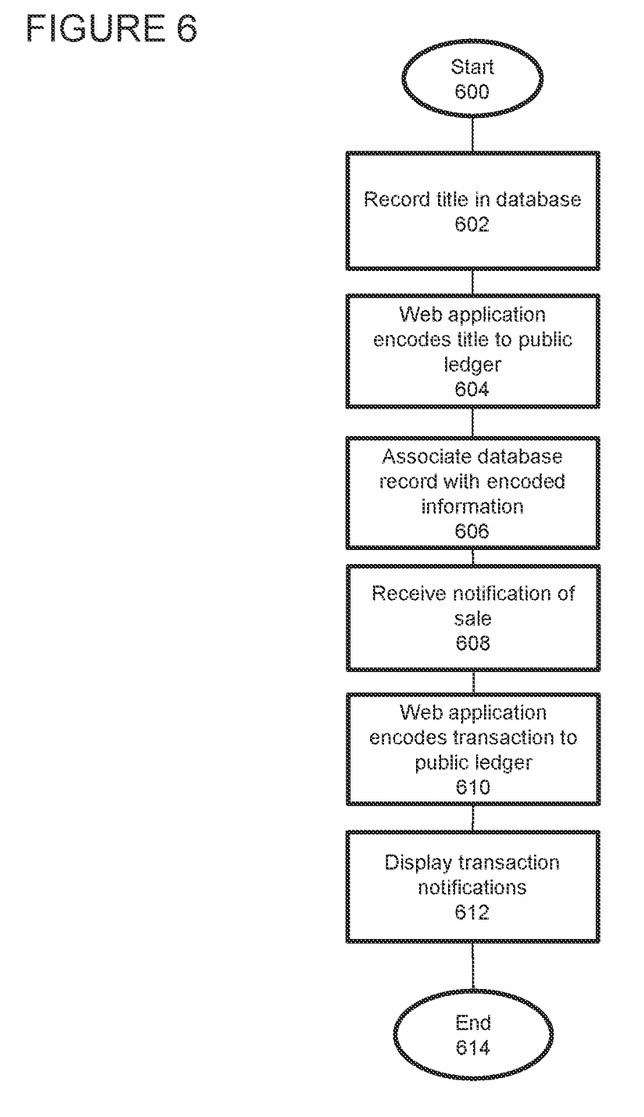
FIG. 6 is a flowchart for a method of transferring paper title assets making use of cryptographic public ledgers via a processor-operated web application that tracks title chain.

FIG. 6 is a flowchart for a method of transferring paper title assets making use of cryptographic public ledgers via a processor-operated web application that tracks title chain. In step 602, a web server records into a database, a receipt record for a paper title for a non-monetary asset stored with a physical caretaker from an owner. In step 604, a web application encodes identifying information associated with the paper title to a distributed consensus network maintaining a cryptographically verifiable ledger utilizing a proof-of-work process to enforce a chronological order amongst logistic transaction records in the cryptographically verifiable ledger. Information associated with the paper title includes; identification of the physical caretaker; identification of the non-monetary asset; and identification of the current owner of the non-monetary asset.

In step 606, the web server associates in the database the receipt record with the encoded identifying information. In step 608, the web server receives a notification from the owner of the of the non-monetary asset to transfer the title to another party. In step 610, the web application encodes transaction data associated with the transfer of title from the owner to the other party on the distributed consensus network. In step 612, user interface for the web application provides notification to the physical caretaker to transfer ownership of the paper title to the other party.

In some embodiments, process steps include:

A. a first user providers a paper title or access to electronic title to a management system. B. Title information (all or in part) is stored on the a public ledger through a transaction record and access provided to the owner(s) of an associated digital wallet key. The title is protected in a wallet locked by a private key (or keys). Multiple keys can be used or a key can be split. C. Title information in the management system can be encrypted and/or signed. Signature can be from the management system or a regulatory agency (dmv) to validate it is a legitimate title.

D. the first user keeps title in a personal wallet, web wallet, custodial wallet, or a multisig wallet. His/her part of the private key can be secured in multiple ways. Other parties will manage their private keys. E. Upon sale (or other events), a transfer is be initiated. Transfer from the owner is initiated by creating a transfer transaction by the management system and identifying the recipient's address. F. Additional conditions can be provided, for example, transfer to only take place with an Escrow, or after all parties sign, or after funds are digitally verified. Escrow can be implemented with 2 of 3 signatures so once all parties have signature authority on the transaction, and escrow can verify the conditions are met, the buyer and the escrow can sign (without the seller) to complete the transaction.

G. All parties agree to steps E-F. H. Recipient provides his/her identifying information (only if required by regulations/DMV otherwise optional). I. First user signs the transaction with private key to initiate the transfer. J. In case of "Escrow", the escrow organization signs the transaction with his/her private key.

K. The recipient now has the title in his/her wallet. The receiver could be using the same service or different service for the wallet. L. The first user (themselves or the management system) can update DMV of this change. M. The recipient can initiate a request to DMV (via his/her wallet provider or separately) to record the change and pay the necessary fees. New owner now can go back to step A.

The invention claimed is:

1. A computer-implemented method of computer cryptography, comprising:
   receiving, by a web server communicatively connected to the Internet, a registration request from a first computing device of a first user owning an electronic or physical title, the web server including application software comprising:
   an interface module,
   an encryption engine,
   a decryption engine,
   a records database, and
   a security key management system configured to store a cryptographic key;
   generating, by the web server application software, a digital title, at least partly based on the electronic or physical title;
   generating, by the web server application software, a digital wallet having an associated public and private key pair, the digital wallet being associated with the first user, wherein the digital wallet comprises an association with a distributed consensus network, the distributed consensus network maintaining a cryptographically verifiable ledger utilizing a proof process to enforce a chronological order amongst transaction records in the cryptographically verifiable ledger;
   recording in the records database, by the web server application software, identifying information of the digital wallet and information indicating association of the first user with the digital wallet;
   encoding, by the web server application software, identifying information associated with the digital title to the digital wallet and to the distributed consensus network, wherein the encoding to the distributed consensus network comprises:
   accessing, by the web server application software, the private key associated with the digital wallet,
   generating a hash by the web server application software, by hashing the identifying information, and submitting the hash, at a submission time, to the distributed consensus network,
   signing a transaction of the distributed consensus network using the accessed private key, wherein the transaction comprises the encoded identifying information,
   receiving, via the web server application software, a public key being associated with the private key of the first user's digital wallet, and
   verifying the signing of the transaction by generating, via the web server application software, a verification hash of the identifying information using the received public key of the first user and comparing the verification hash with the hash of the identifying information at the submission time;
   maintaining, in a recipient transaction record, a first nominal transaction amount corresponding to a notification transaction indicating a transfer of title and a second nominal transaction amount corresponding to a potential future transfer of title from the second user to a third user; and
   transmitting, by the web server application software, a notification transaction accessible by a bank or regulatory agency where the electronic or physical title is held, the notification transaction comprising information indicating a transfer of title from the first user to the second user, and further transmitting the first nominal transaction amount along with the notification transaction.

2. The method of claim 1, further comprising:
   receiving, by the web server application software, a request for data associated with the title;
   retrieving, by the web server application software, the encoded identifying information from the distributed consensus network;
   decoding, by the web server application software, the encoded identifying information;
   transmitting, by the web server application software, the decoded identifying information over a secure channel to the computing device of the first user; and
   displaying the decoded identifying information on a user interface of the computing device of the first user.

3. The method of claim 1, wherein the identifying information comprises one or more of:
   identification of a bank or regulatory agency where the electronic or physical title is held;
   identification of an asset pertaining to the physical or electronic title; and
   identification of the first user.

4. The method of claim 1, further comprising:
   recording, by the web server application software, one or more correspondences,
   associating, by the web server application software, one or more identifying information of the digital title to one or more amounts in the digital wallet, and wherein encoding identifying information further comprises inserting the one or more amounts into the digital wallet based on the recording of the one or more correspondences.

5. The method of claim 4 further comprising:
   receiving, by the web server application software, a request to transfer the title to a second user;
   receiving, by the web server application software, an access key associated with the first user;
   authenticating, by the web server application software, the first user by verifying the association of the received access key with the first user;
   receiving, by the web server application software, an address associated with a digital wallet of the second user;
   generating, by the web server application software, a transaction of the distributed consensus network comprising a transfer of the one or more amounts from the digital wallet of the first user to the address of the digital wallet of the second user, and
   propagating the encrypted transaction through the distributed consensus network.

6. The method of claim 1, further comprising:
receiving, by the web server application software, a request from the first computing device to transfer the title to a second user;
receiving, by the web server application software, an access key associated with the first user; and
identifying, by the web server application software, the first user by verifying the association of the received access key with the first user.

7. The method of claim 6, further comprising:
retrieving, by the web server application software, a private key associated with the digital wallet from the database;
using the retrieved private key, encrypting, by the web server application software, transfer data associated with the request to transfer title;
generating, by the web server application software, an encrypted transaction of the distributed consensus network, comprising the encrypted transfer data;
propagating the encrypted transaction through the distributed consensus network; and
transmitting, by the web server application software, a notification transaction accessible by a bank or regulatory agency where the electronic or physical title is held.

8. The method of claim 1, wherein the distributed consensus network operates on a Byzantine fault tolerance.

9. The method of claim 1, further comprising:
generating, by the web server application software, a nominal transaction amount of cryptocurrency in a nominal transaction amount;
in an issuance transaction record, transferring, by the web server application software, the transaction amount from an issuing address to the digital wallet, wherein the issuing address is not directly associated with an original owner and is generated by the web server as a placeholder;
in the issuance transaction record, transferring, by the web server, a fee amount for the issuance transaction to the distributed consensus network;
in the recipient transaction record, transferring, by the digital wallet, the transaction amount to a buyer cryptocurrency address;
in the recipient transaction record, transferring, by the web server, an amount of cryptocurrency equal to the sum of the transaction amount and a fee amount for the recipient transaction into the recipient transaction record and transferring out of the recipient transaction record the transaction amount to a regulatory agency and the fee amount for the recipient transaction to the distributed consensus network.

10. A system comprising:
a distributed consensus network, accessible via the Internet, the network maintaining a cryptographically verifiable ledger utilizing a proof process to enforce a chronological order amongst transaction records in the cryptographically verifiable ledger;
a processor operated web server, comprising an interface module, a records database, an encryption engine, a decryption engine, and a key management system, and wherein the interface module is configured to receive a registration request from a computing device of a first user owning an electronic or physical title, wherein the web server is configured to generate a digital title, at least partially based on the electronic or physical title, wherein the web server is further configured to generate a digital wallet associated with the first user and associated with the distributed consensus network, wherein the user interface module is further configured to generate a display of a completed transaction and wherein the key management system is configured to receive and store a private key from the first user; and
wherein the processor operated web server is further configured to record in the records database, by the web server application software, title information of the digital title including identification of an asset associated with the electronic or physical title;
wherein the processor operated web server is further configured to direct identifying, information associated with the digital title to be encoded on the distributed consensus network and the digital wallet,
wherein the encoding to the distributed consensus network further comprises generating a hash by hashing the identifying information, and submitting the hash, at a submission time, to the distributed consensus network, and signing a transaction of the distributed consensus network by a private key of the first user, wherein the transaction comprises the encoded identifying information,
wherein the processor operated web server is further configured to receive a public key being associated with the private key of the first user,
wherein the processor operated web server is further configured to verify the signing of the transaction by generating, via the web server application software, a verification hash of the identifying information using the received public key and comparing the verification hash with the hash of the identifying information at the submission time, and
wherein the processor operated web server is further configured to maintain, in a recipient transaction record, a first nominal transaction amount corresponding to a notification transaction indicating a transfer of title and a second nominal transaction amount corresponding to a potential future transfer of title from the second user to a third user.

11. The system of claim 10, wherein the interface module is configured to receive a request for data associated with the title and wherein the web server is configured to retrieve the encoded identifying information from the distributed consensus network, and the web server is further configured to decode the encoded identifying information and display the decoded identifying information on a user interface of the computing device of the first user.

12. The system of claim 10, wherein the identifying information comprises one or more of:
identification of a bank or regulatory agency where the electronic or physical title is held;
identification of an asset pertaining to the physical or electronic title; and
identification of the first user.

13. The system of claim 10, wherein the web server is further configured to record one or more correspondences, associating one or more identifying information of the digital title to one or more amounts in the digital wallet, and wherein encoding identifying information further comprises inserting the one or more amounts into the digital wallet based on the recording of the one or more correspondences.

14. The system of claim 13, wherein the web server is further configured to:
receive a request, from the computing device of the first user, to transfer the title to a second user;
receive an access key associated with the first user;

authenticate the first user by verifying the association of the received access key with the first user;

receive, by the web server, an address associated with a digital wallet of the second user; and generate a transaction of the distributed consensus network comprising a transfer of the one more amounts from the digital wallet of the first user to the address of the digital wallet of the second user.

15. The system of claim 10, wherein the interface module is further configured to receive a request to transfer the title to a second user; and the web server is configured to receive an access key associated with first user and identify the first user by verifying the association of the received access key with the first user.

16. The system of claim 15, wherein the web server is further configured to:

retrieve a private key associated with the digital wallet from the records database;

using the private key, encrypt transfer data associated with the request to transfer title;

generate an encrypted transaction of the distributed consensus network, comprising the encrypted transfer data;

propagate the encrypted transaction through the distributed consensus network;

transmit a notification transaction accessible by a bank or regulatory agency where the electronic or physical title is held, and further transmit the first nominal transaction amount along with the notification transaction.

17. The system of claim 10, wherein the distributed consensus network operates on a Byzantine fault tolerance.

* * * * *